(12) United States Patent
Xiao

(10) Patent No.: US 10,770,960 B2
(45) Date of Patent: Sep. 8, 2020

(54) PERMANENT MAGNET ASSISTED SYNCHRONOUS RELUCTANCE MOTOR FOR INCREASING MINIMUM ELECTROMAGNETIC TORQUE

(71) Applicant: Green Refrigeration Equipment Engineering Research Center of Zhuhai Gree Co., Ltd., Zhuhai (CN)

(72) Inventor: Yong Xiao, Zhuhai (CN)

(73) Assignee: Green Refrigeration Equipment Engineering Research Center of Zhuhai Gree Co., Ltd., Zuhai (CN)

( * ) Notice: Subject to any disclaimer, the term of this patent is extended or adjusted under 35 U.S.C. 154(b) by 873 days.

(21) Appl. No.: 15/193,021

(22) Filed: Jun. 25, 2016

(65) Prior Publication Data

US 2016/0308428 A1    Oct. 20, 2016

Related U.S. Application Data

(63) Continuation of application No. PCT/CN2014/087300, filed on Sep. 24, 2014.

(30) Foreign Application Priority Data

Dec. 25, 2013  (CN) .......................... 2013 1 0737745

(51) Int. Cl.
*H02K 1/27* (2006.01)
*H02K 29/03* (2006.01)
(Continued)

(52) U.S. Cl.
CPC ........... *H02K 29/03* (2013.01); *H02K 1/2706* (2013.01); *H02K 1/2766* (2013.01); *H02K 1/28* (2013.01);
(Continued)

(58) Field of Classification Search
CPC .... H02K 1/276; H02K 1/2766; H02K 1/2773; H02K 29/03; H02K 1/28; H02K 1/246;
(Continued)

(56) References Cited

U.S. PATENT DOCUMENTS 6,218,753 B1 * 4/2001 Asano ................... H02K 1/276
                                                                310/156.53
8,760,025 B2 * 6/2014 Rahman ............... H02K 1/2766
                                                                310/156.38
(Continued)

FOREIGN PATENT DOCUMENTS

CN          101640463 A       2/2010
CN          102761221 A      10/2012
(Continued)

*Primary Examiner* — Maged M Almawri
(74) *Attorney, Agent, or Firm* — Franklin & Associates International Inc; Matthew F. Lambrinos

(57) ABSTRACT

A permanent magnet motor, comprising a stator (1) and a rotor (4); the rotor comprises a rotor iron core (5) and permanent magnets (7a, 7b); in the radial direction of the rotor, each magnetic pole of the rotor iron core is provided with multiple layers of arc-shaped permanent magnet grooves (6a, 6b); a q-axis magnetic flux path is formed between two neighboring magnetic poles; the permanent magnets are disposed in the permanent magnet grooves; two neighboring magnetic poles of the rotor are respectively a first magnetic pole and a second magnetic pole having opposite polarities; an outer endpoint of a permanent magnet in the first magnetic pole is a first outer endpoint, said outer endpoint is farther from the q-axis; an outer endpoint of the permanent magnet in the second magnetic pole is a second outer endpoint, said outer endpoint is farther from the q-axis; an included angle A of the first outer endpoint and the second outer endpoint with respect to the center of the rotor is less than an electrical angle of 80 degrees, the number of stator slots being N, the number of pairs of rotor poles being P, the (Continued)

number of phases of windings being m, and the number of stator slots per pole per phase (N/2P/m) being an integer. As compared with motors having existing structures, the permanent magnet motor dramatically reduces the torque ripple thereof.

13 Claims, 12 Drawing Sheets

(51) Int. Cl.
*H02K 1/28* (2006.01)
*H02K 1/24* (2006.01)

(52) U.S. Cl.
CPC ......... *H02K 1/246* (2013.01); *H02K 2213/03* (2013.01)

(58) Field of Classification Search
CPC .... H02K 2213/03; H02K 1/27; H02K 1/2706; H02K 1/2713; H02K 1/272; H02K 1/2726; H02K 1/2733
USPC ........................... 310/156.53–156.57, 156.11
See application file for complete search history.

(56) References Cited

U.S. PATENT DOCUMENTS

| | | | |
|---|---|---|---|
| 2002/0047409 A1* | 4/2002 | Hiroyuki | H02K 15/03 310/100 |
| 2010/0079026 A1 | 4/2010 | Han et al. | |
| 2014/0042834 A1* | 2/2014 | Asahi | H02K 1/04 310/43 |
| 2014/0167550 A1* | 6/2014 | Huang | H02K 1/2766 310/156.19 |
| 2014/0225469 A1* | 8/2014 | Yoshikawa | H02K 1/2773 310/156.53 |
| 2015/0303749 A1* | 10/2015 | Okubo | H02K 29/03 310/156.38 |

FOREIGN PATENT DOCUMENTS

| | | |
|---|---|---|
| CN | 102801236 A | 11/2012 |
| CN | 103166350 A | 7/2013 |
| CN | 203674941 U | 7/2014 |

* cited by examiner

PERMANENT MAGNET ASSISTED SYNCHRONOUS RELUCTANCE MOTOR FOR INCREASING MINIMUM ELECTROMAGNETIC TORQUE

CROSS REFERENCE TO RELATED APPLICATIONS

This application is a continuation application of PCT Patent Application No. PCT/CN2014/087300, entitled "Permanent Magnet Motor", filed on Sep. 24, 2014, which claims priority to Chinese Patent Application No. 201310737745.1, entitled "Permanent Magnet Motor", filed on Dec. 25, 2013, the entire contents of which are incorporated herein by reference.

TECHNICAL FIELD

The present disclosure relates to the technical field of a motor, more particularly, to a permanent magnet motor.

BACKGROUND

As for an interior permanent magnet motor (IPM), whose permanent magnets are arranged in the interior of the motor, the resultant electromagnetic torque includes a permanent magnet torque and a reluctance torque. The permanent magnetic torque is generated by the rotor permanent magnetic field interacted with the stator magnetic field. The reluctance torque is generated by the stator magnetic field interacted with the rotor iron core whose direct-axis inductance and quadrature-axis inductance are different. As compared with a surface-mounted permanent magnet motor (SPM), whose permanent magnets are mounted on the surface of the rotor iron core, the interior permanent magnet motor (IPM) can achieve the high efficiency more easily with the increased utilization of the reluctance torque.

Whereas the permanent magnet assisted synchronous reluctance motor with multiple layers of permanent magnets arranged in the rotor, as compared with the IPM motor, further increases the difference between the direct-axis inductance and the quadrature-axis inductance, greatly increases the utilization of the reluctance torque, realizes the high efficiency of the motor, and greatly reduces the cost of the motor. For example, the patent ZL201210056204.8 discloses a rotor structure capable of increasing the utilization of the reluctance torque of a motor.

But the research found that, along with the increase of the utilization of the reluctance torque of a motor, the percentage of the reluctance torque in the resultant electromagnetic torque would be increased, and thus increasing the torque ripple of the motor, and further causing problems of vibrations and acoustic noises of the motor. Especially when a field weakening control for the motor is needed in order that the motor can run at a high speed, the percentage of the reluctance torque will be greater, and the problems will be more significant.

US patent application with publication No. US20100079026 discloses a permanent magnet motor, whose number of stator slots per pole pair is an odd, wherein, through adjusting the angle profile of the rotor permanent magnets, the magnetic field profile of the permanent magnets is improved, thereby reducing the harmonic content, further reducing the eddy current loss and the torque ripple. According to the patent application, what improved is mainly the magnetic field profile of the rotor permanent magnets, which helps to reduce the permanent magnetic torque ripple, but has no effect on restraining the reluctance torque ripple. What's more, as the number of stator slots per pole pair is an odd, it means that the number of stator slots per pole per phase (the number of stator slots/the number of pole pairs/the number of phases of windings/2) is a fraction. The current research shows that, the stator magnetic field of the motor whose number of the stator slots per pole per phase is a fraction, has much more harmonic content than the stator magnetic field of the motor whose number of the stator slots per pole per phase is an integer, therefore, the former motor is not good for reducing the reluctance torque ripple.

As compared with the motor with a single layer of permanent magnet, the permanent magnet assisted synchronous reluctance motor with multiple layers of permanent magnets arranged in the rotor may increase the difference between the direct-axis inductance and the quadrature-axis inductance, thereby greatly increasing the utilization of the reluctance torque, and realizing greater output torque and higher efficiency; but some problems will occur along with the increase of the percentage of the reluctance torque in the total electromagnetic torque due to the main reason that, the reluctance torque is apt to generate ripples due to the change of the relative positions of the stator and the rotor, which will increase the electromagnetic torque ripple of the motor, thereby causing the motor to vibrate and generate larger noises.

In the prior art, in order to reduce the torque ripple of the permanent magnet assisted synchronous reluctance motor, a common method is increasing the number of the stator slots of the motor and the number of the layers of the permanent magnets arranged in the rotor, but this method will make the manufacturability of the motor more complex, and the reduction extent of the torque ripple is limited. As shown in FIG. 1, the permanent magnet assisted synchronous reluctance motor comprises a stator 1 and rotor 4. Wherein, the stator comprises at least the stator iron core 2 made of magnetic material and the stator windings 3; the rotor 4 comprises at least the rotor iron core 5, each rotor pole of the rotor iron core comprises multiple permanent magnet grooves 6a and 6b, and permanent magnets 7a and 7b arranged in the permanent magnet grooves.

SUMMARY OF THE INVENTION

In view of the situations in the prior art, the research found that, during the rotation of the motor with load, the magnetic field of the stator always lies, along the rotation direction of the motor, in front of the magnetic field of the rotor, as shown in FIG. 2. Furthermore, the magnetic field of the stator mostly concentrates within a certain angle range; magnetic lines of the rotor need to go through the ends of the magnetic flux paths located adjacent to the outer segments of the permanent magnet grooves before entering the stator and connecting to the magnetic lines of the stator. When the rotor rotates, the change of the relative positions of the magnetic flux paths of the rotor with respect to the stator teeth will change the magnetic resistance in the routes of the magnetic lines, thereby generating torque ripples. When the ends of the permanent magnet grooves of the rotor block the routes of the magnetic lines, the instantaneous torque of the motor is less than the average electromagnetic torque; and the longer time the routes of the magnetic lines are blocked, the smaller the minimum peak torque value is, and the larger the torque ripple of the motor will be.

One objective of the present disclosure is to provide a permanent magnet motor. As compared with motors having existing structures, the motor of the present disclosure dramatically reduces the torque ripple thereof. In order to realize the objective above, the technical schemes of the present invention are as follows:

A permanent magnet motor comprises a stator and a rotor; said stator comprises a stator iron core and windings; wherein, the rotor comprises a rotor iron core and permanent magnets; in the radial direction of the rotor, each magnetic pole of the rotor iron core is provided with multiple layers of arc-shaped permanent magnet grooves; a q-axis magnetic flux path is formed between two neighboring magnetic poles; the permanent magnets are disposed in the permanent magnet grooves;

two neighboring magnetic poles of the rotor are respectively a first magnetic pole and a second magnetic pole, the first and second magnetic poles have opposite polarities; an outer endpoint of a permanent magnet arranged in the first magnetic pole is a first outer endpoint, said outer endpoint is farther from the q-axis; an outer endpoint of a permanent magnet arranged in the second magnetic pole is a second outer endpoint, said outer endpoint is farther from the q-axis; an included angle A between the first outer endpoint and the second outer endpoint with respect to a center of the rotor is less than an electrical angle of 80 degrees; wherein number of stator slots is N; number of pairs of rotor poles is P; number of phases of windings is m; and number of stator slots per pole per phase (N/2P/m) is an integer.

In one of the embodiments, in the radial direction of the rotor, each magnetic pole of the rotor iron core is provided with two layers of arc-shaped permanent magnet grooves; an outer endpoint of an outer layer of permanent magnet in the first magnetic pole is a first outer endpoint, said outer endpoint is farther from the q-axis; an outer endpoint of an outer layer of permanent magnet in the second magnetic pole is a second outer endpoint, said outer endpoint is farther from the q-axis.

Further, an outer endpoint of an inner layer of permanent magnet in the first magnetic pole is a third outer endpoint, said outer endpoint is farther from the q-axis; an outer endpoint of an inner layer of permanent magnet in the second magnetic pole is a fourth outer endpoint, said outer endpoint is farther from the q-axis; an included angle B between the third outer endpoint and the fourth outer endpoint with respect to the center of the rotor is configured to be less than an inner included angle C between two stator tooth parts spaced by one stator tooth, with respect to the center of the rotor.

In one of the embodiments, in the radial direction of the rotor, each magnetic pole of the rotor iron core is provided with three layers of arc-shaped permanent magnet grooves; an outer endpoint of the intermediate layer of permanent magnet in the first magnetic pole is a first outer endpoint, said outer endpoint is farther from the q-axis; an outer endpoint of the intermediate layer of permanent magnet in the second magnetic pole is a second outer endpoint, said outer endpoint is farther from the q-axis.

Further, an outer endpoint of a permanent magnet arranged in the innermost layer of the first magnetic pole is a fifth outer endpoint, said outer endpoint is farther from the q-axis; an outer endpoint of a permanent magnet in the innermost layer of the second magnetic pole is a sixth outer endpoint, said outer endpoint is farther from the q-axis; an included angle B between the fifth outer endpoint and the sixth outer endpoint with respect to the center of the rotor is configured to be less than the inner included angle C between two stator tooth parts spaced by one stator tooth, with respect to the center of the rotor.

In one of the embodiments, the number of stator slots of the motor is N; the number of pairs of rotor poles is P; the number of stator slots per pole per phase (N/2P/m) is two; and the included angle A is less than an outer included angle D between two stator tooth parts spaced by one stator tooth, with respect to the center of the rotor.

In one of the embodiments, a filling ratio of the permanent magnets in the permanent magnet grooves is configured to be greater than 85%.

In one of the embodiments, the q-axis magnetic flux path is formed between each two neighbouring layers of permanent magnet grooves; one endpoint of the magnetic flux path directly faces one stator tooth, and the other endpoint of the magnetic flux path directly faces one stator slot.

In one of the embodiments, a width S between the magnetic poles of the rotor is less than a width G of a slot opening of the stator slot.

In one of the embodiments, a width of a flux barrier is configured to be uneven; and the width decreases gradually from a center line of the magnetic pole to the q-axis.

In one of the embodiments, the endpoint of the permanent magnet groove is biased towards the q-axis.

In one of the embodiments, the endpoints of inner arcs of the permanent magnet grooves are cut into chamfers.

The beneficial effects of the present disclosure are as follows:

The permanent magnet motor of the present disclosure can restrain the torque ripple of the permanent magnet assisted synchronous reluctance motor with multiple layers of permanent magnets arranged in the rotor, and reduce the fluctuation of the difference between the direct-axis inductance and the quadrature-axis inductance along with the change of the relative position of the rotor with respect to the stator tooth slots. As compared with motors having existing structures, the motor of the present disclosure dramatically reduces the torque ripple thereof.

DETAILED DESCRIPTION OF THE PREFERRED EMBODIMENTS

Figure 1:
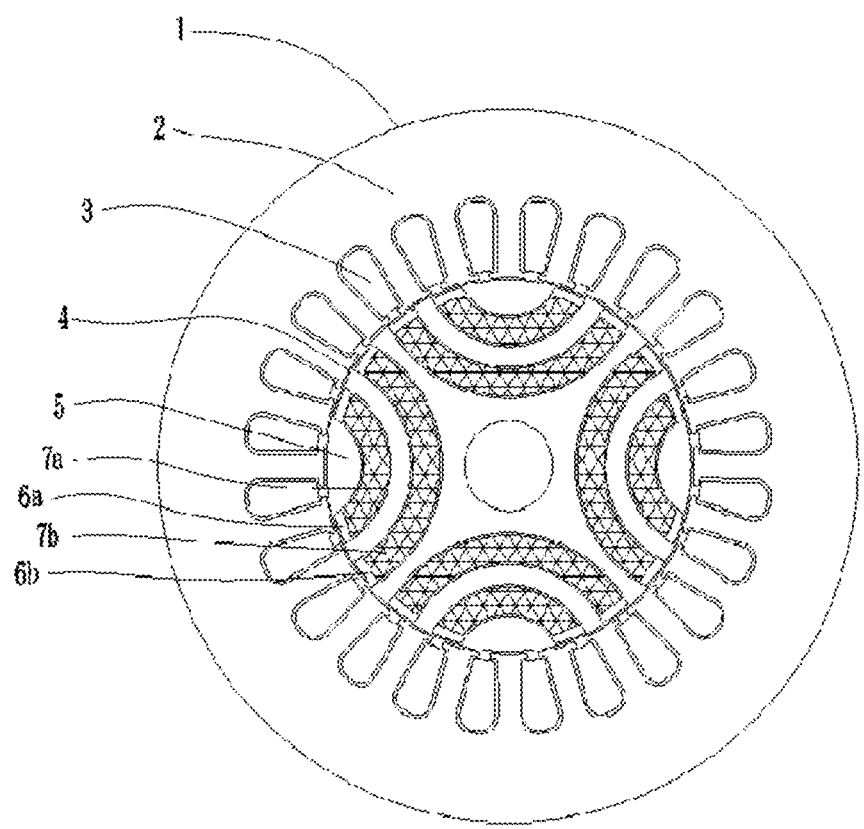
FIG. 1 is a schematic diagram of the permanent magnet motor in the prior art.
Figure 2:
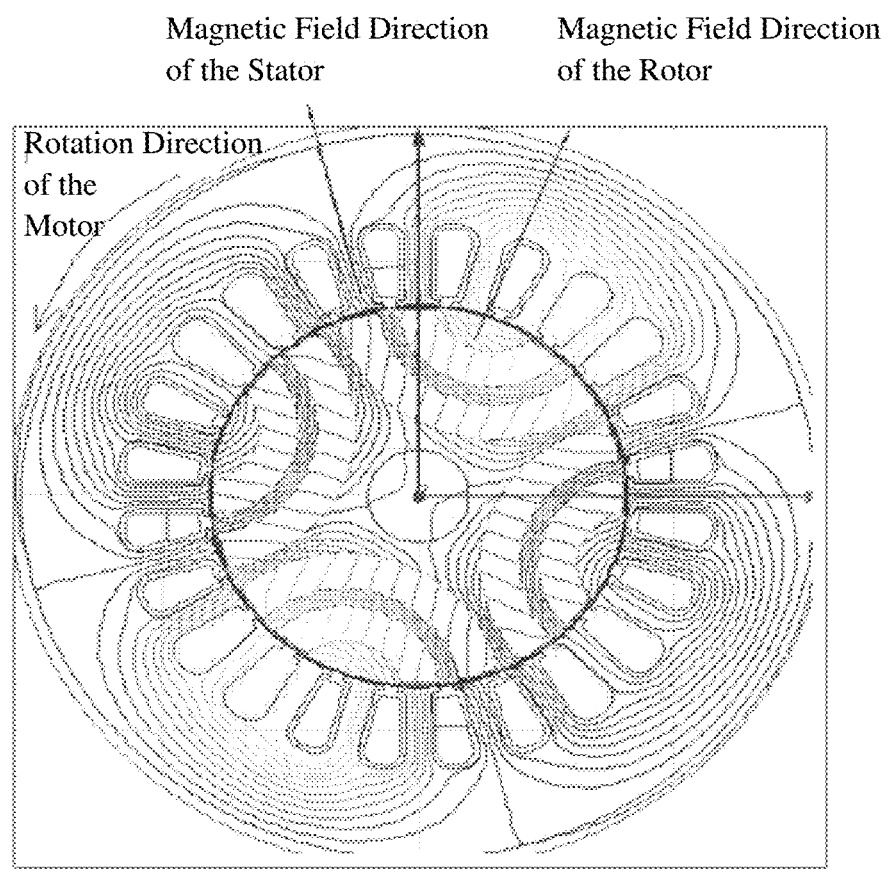
FIG. 2 is a distribution diagram of magnetic lines when the permanent magnet motor of FIG. 1 operates with load.

In order to make the objectives, technical schemes and advantages of the present disclosure more apparent and better understood, the permanent magnet motor of the present disclosure will be described in more details with reference to the accompanying figures and embodiments. It should be understood that the embodiments described herein are used merely to explain the present invention, but not to limit the scope of the present invention.

As shown in FIGS. 3 to 13, in one embodiment of the present invention, the permanent magnet motor includes a stator 1 and a rotor 4; the stator 1 includes a stator iron core 2 and windings 3, and the rotor 4 includes a rotor iron core 5 and permanent magnets 7a, 7b. In the radial direction of the rotor 4, each magnetic pole of the rotor iron core 5 is provided with multiple layers of arc-shaped permanent magnet grooves 6a, 6b; a q-axis magnetic flux path is formed between two neighboring magnetic poles; the permanent magnets 7a, 7b are disposed in the permanent magnet grooves 6a, 6b.

Figure 3:
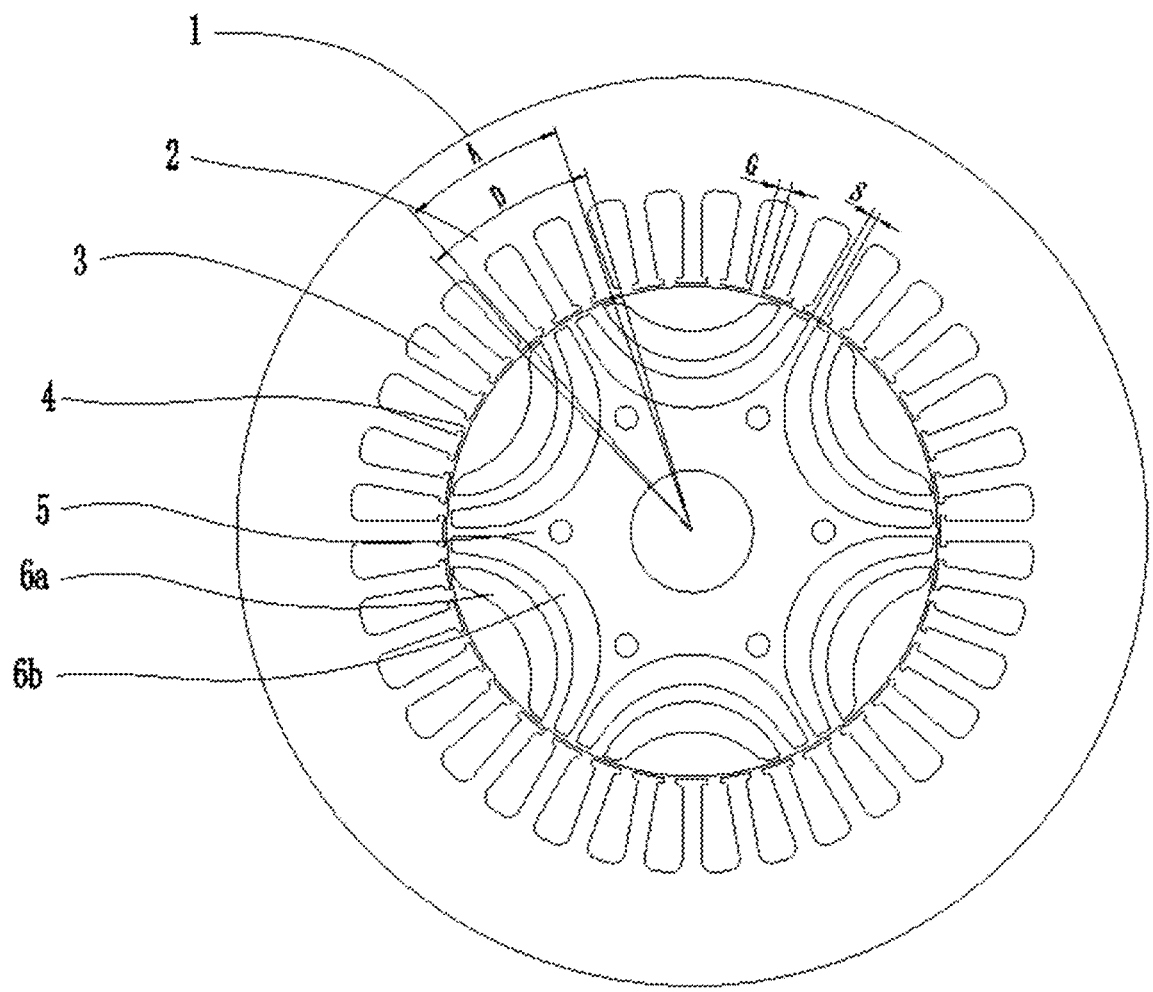
FIG. 3 is a structural schematic diagram illustrating the permanent magnet motor according to one embodiment of the present invention, wherein, the rotor of the permanent magnet motor includes two layers of permanent magnets.
Figure 4:
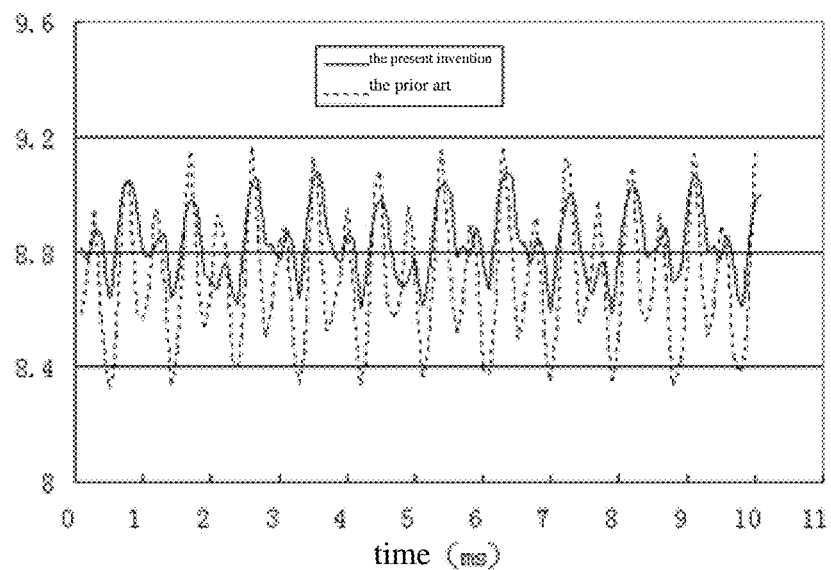
FIG. 4 is a comparison diagram illustrating the fluctuations of the inductance difference between the permanent magnet motor of FIG. 3 and the permanent magnet motor in the prior art.
Figure 5:
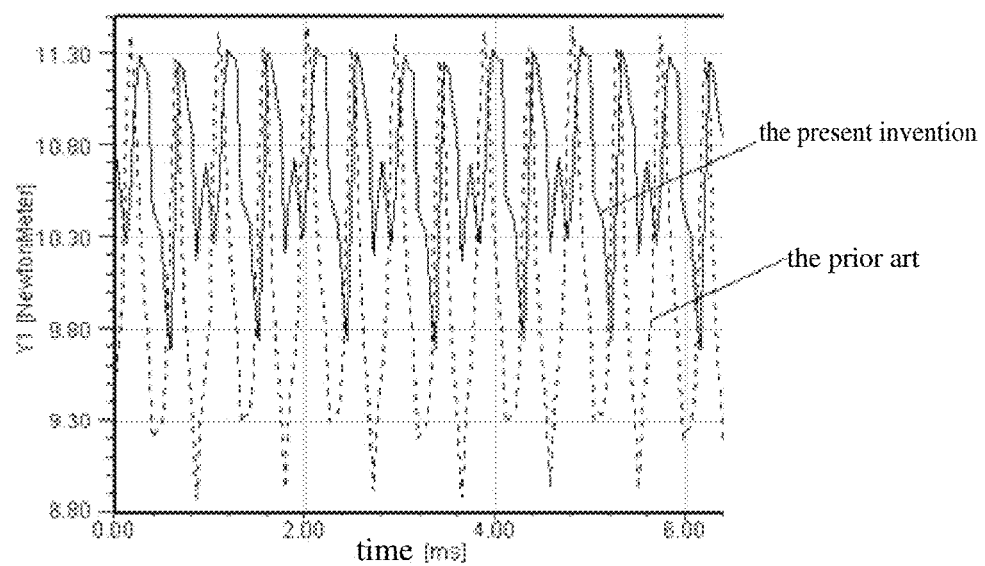
FIG. 5 is a comparison diagram illustrating the torque ripple of the permanent magnet motor of FIG. 3 and that of the permanent magnet motor in the prior art.

The two neighboring magnetic poles of the rotor 4 are respectively a first magnetic pole and a second magnetic pole having opposite polarities. An outer endpoint of a permanent magnet 7a arranged in the first magnetic pole is a first outer endpoint, said outer endpoint is farther from the q-axis; an outer endpoint of the permanent magnet 7b arranged in the second magnetic pole is a second outer endpoint, said outer endpoint is farther from the q-axis. An included angle A (an outer included angle) between the first outer endpoint and the second outer endpoint with respect to the center of the rotor 4 is less than an electrical angle of 80 degrees, wherein the number of stator slots 9 (slot number) is N, the number of pairs of rotor poles is P, the number of phases of windings is m, and the number of stator slots per pole per phase (N/2P/m) is an integer. Preferably, the filling ratio of the permanent magnets in the permanent magnet grooves is greater than 85%; in order to reduce the percentage of the reluctance torque in the total electromagnetic torque, the filling ratio of the permanent magnets in the permanent magnet grooves is configured to be greater than 85%, thereby the total electromagnetic torque ripple is reduced. The outer included angle A between the endpoints of the outer layers of permanent magnets in a pair of poles is configured to be less than an electrical angle of 80 degrees, so that the time duration when the routes of the magnetic lines are blocked by the endpoints of the permanent magnet grooves of the rotor will be reduced, thereby increasing the minimum difference between the direct-axis inductance and the quadrature-axis inductance during the fluctuation, as shown in FIG. 4. Consequently, the minimum value of the electromagnetic torque is effectively increased, as shown in FIG. 5, the minimum torque value of the torque ripple of the improved motor is greatly increased as compared to that in the prior art. Preferably, as shown in FIG. 3, the number of stator slots of the motor is N; the number of pairs of rotor poles is P; the number of stator slots per pole per phase (N/2P/m) is two; and the included angle A is less than the outer included angle D between two stator tooth parts spaced by one stator tooth of the stator 1, with respect to the center of the rotor 4. And better effects can be achieved in increasing the minimum torque.

As one of the implementations, in the radial direction of the rotor 4, each magnetic pole of the rotor iron core 5 is provided with two layers of arc-shaped permanent magnet grooves. An outer endpoint of an outer layer of permanent magnet 7a in the first magnetic pole is the first outer endpoint, said outer endpoint is farther from the q-axis; an outer endpoint of an outer layer of permanent magnet 7a of the second magnetic pole is the second outer endpoint, said outer endpoint is farther from the q-axis. An included angle A (an outer included angle) between the first outer endpoint and the second outer endpoint with respect to the center of the rotor 4 is less than an electrical angle of 80 degrees.

Further, an outer endpoint of an inner layer of permanent magnet 7b in the first magnetic pole is a third outer endpoint, said outer endpoint is farther from the q-axis; an outer endpoint of the inner layer of permanent magnet 7b in the second magnetic pole is a fourth outer endpoint, said outer endpoint is farther from the q-axis. An included angle B between the third outer endpoint and the fourth outer endpoint with respect to the center of the rotor is configured to be less than the inner included angle C between two stator tooth parts spaced by one stator tooth. The arrangement, that the included angle B between the outer endpoints of the inner layers of permanent magnets is configured to be less than the inner included angle C between two stator tooth parts spaced by one stator tooth, avoids torque ripples caused by changes of the included angle between the magnetic field of the stator and the magnetic field of the inner layers of permanent magnets of the rotor.

Figure 6:
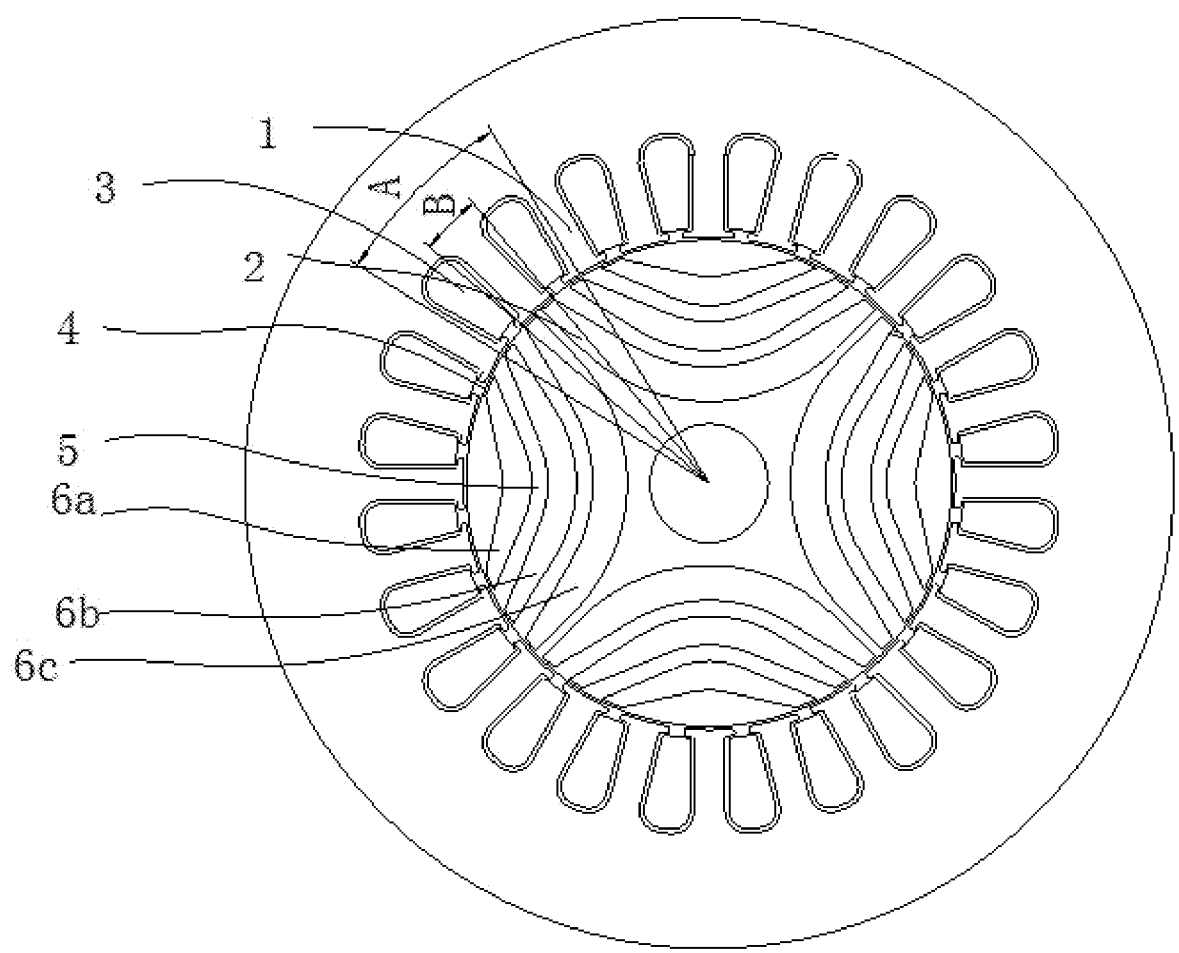
FIG. 6 is a structural schematic diagram illustrating the permanent magnet motor according to another embodiment of the present invention, wherein, the rotor of the permanent magnet motor includes three layers of permanent magnets.
Figure 7:
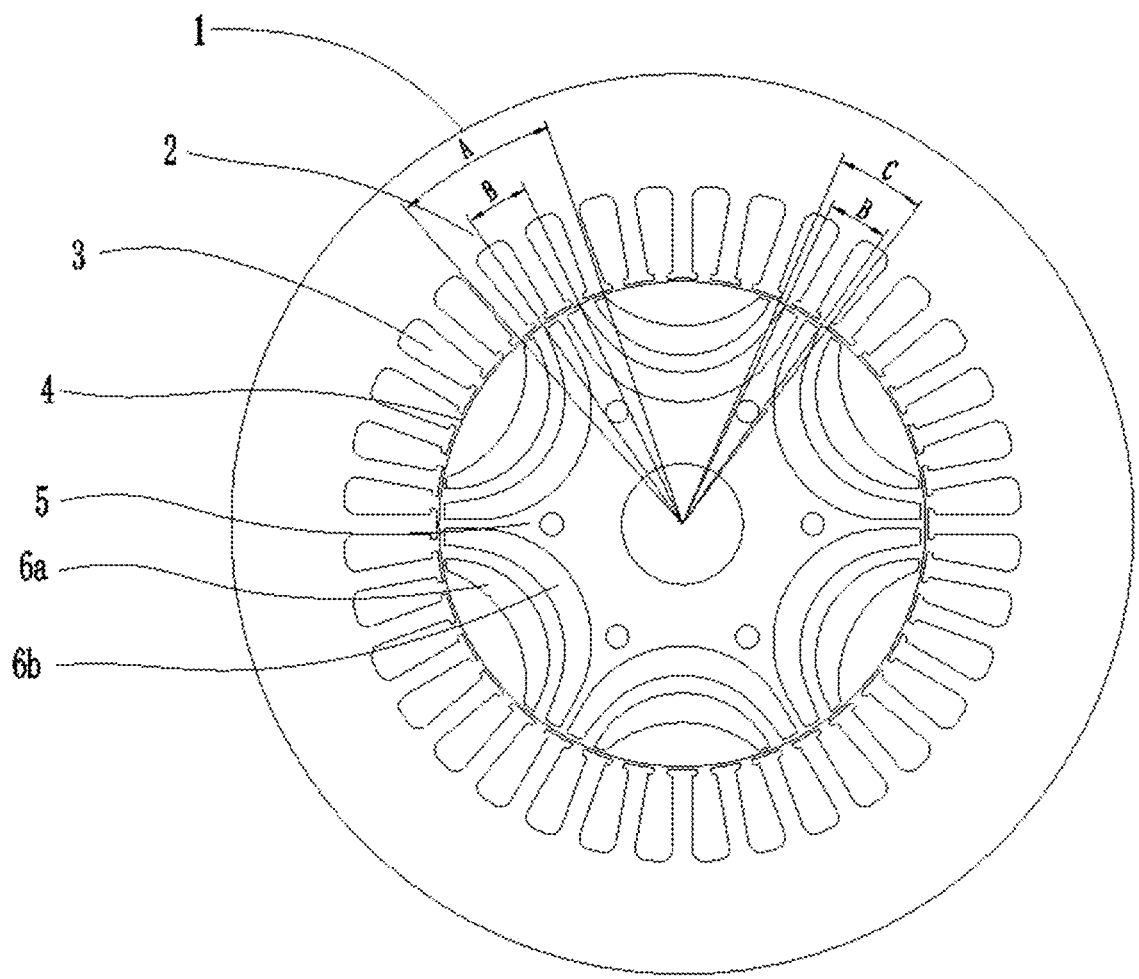
FIG. 7 is a structural schematic diagram illustrating another implementation of the permanent magnet motor of FIG. 3, wherein, the permanent magnet motor is a six-pole motor.

As one of the implementations, as shown in FIG. 6, in the radial direction of the rotor 4, each magnetic pole of the rotor iron core 5 is provided with three layers of arc-shaped permanent magnet grooves 6a, 6b, 6c. An outer endpoint of the intermediate layer of permanent magnet (in the permanent magnet groove 6b) in the first magnetic pole is a first outer endpoint, said outer endpoint is farther from the q-axis; an outer endpoint of the intermediate layer of permanent magnet in the second magnetic pole is a second outer endpoint, said outer endpoint is farther from the q-axis. An included angle A (an outer included angle) between the first outer endpoint and the second outer endpoint with respect to the center of the rotor 4 is less than an electrical angle of 80 degrees.

Further, an outer endpoint of the innermost layer of permanent magnet (in the permanent magnet groove 6c) in the first magnetic pole is a fifth outer endpoint, said outer endpoint is farther from the q-axis; an outer endpoint of the innermost layer of permanent magnet (in the permanent magnet groove 6c) in the second magnetic pole is a sixth outer endpoint, said outer endpoint is farther from the q-axis. An included angle B between the fifth outer endpoint and the sixth outer endpoint with respect to the center of the rotor 4 is configured to be less than the inner included angle C between two stator tooth parts spaced by one stator tooth 11.

In the configuration that the number the permanent magnet layers of the rotor is three, as the routes of the q-axis magnetic lines mainly concentrates at the magnetic flux path located at the inner side of the outermost layer of permanent magnet and between layers of permanent magnets, the arrangement, that an outer included angle A between the endpoints of the intermediate layers of permanent magnets is configured to be less than an electrical angle of 80 degrees, increases the minimum torque value in the torque ripple.

Figure 8:
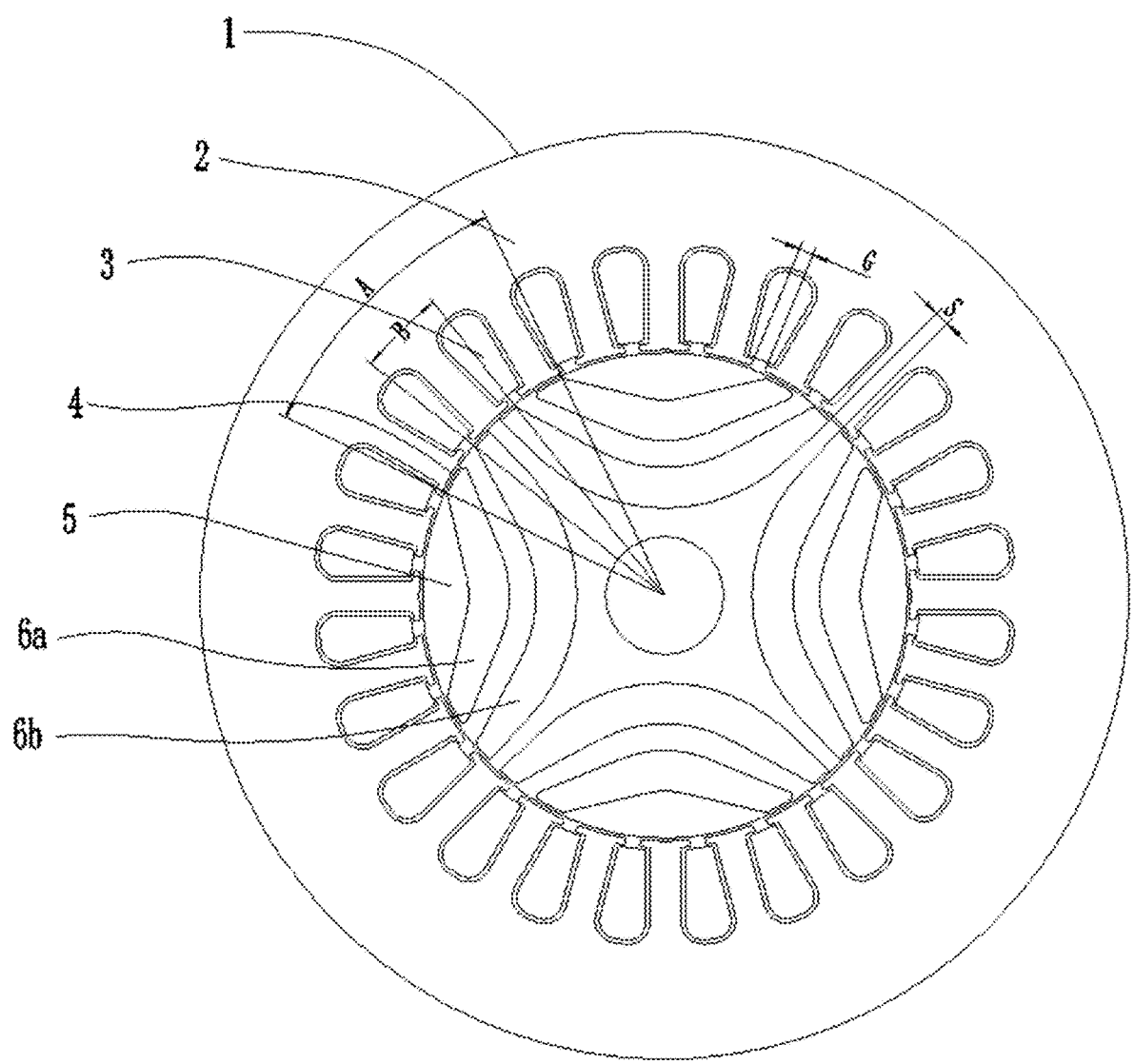
FIG. 8 is a schematic diagram illustrating another implementation of the permanent magnet motor of FIG. 3.
Figure 9:
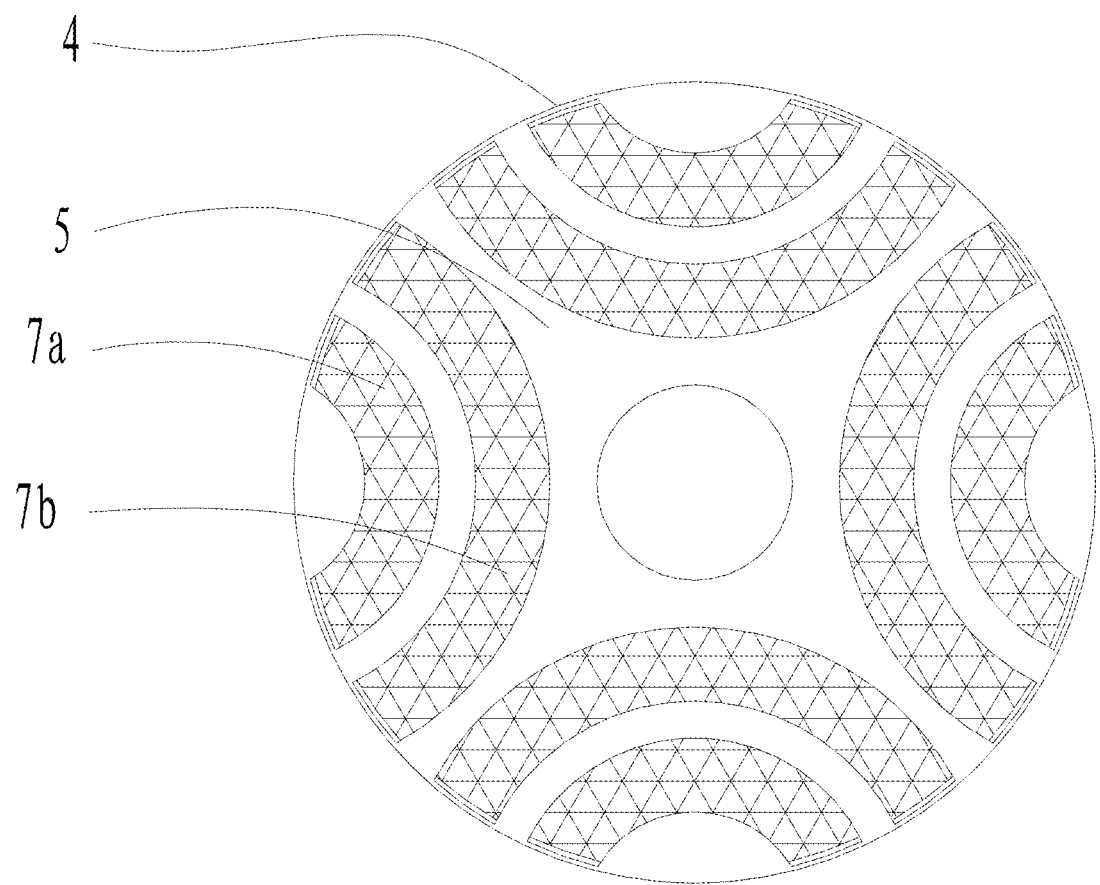
FIG. 9 is a schematic diagram illustrating the filling ratio of the permanent magnet of the permanent magnet motor according to one embodiment of the present invention.

As one of the embodiments, as shown in FIG. 8, the width S between the poles of the rotor is less than the width G of the slot opening of the stator slot. The arrangement, that the width S between the poles of the rotor is less than the width G of the slot opening of the stator slot, reduces the percentage of the magnetic lines from the stator directly going into the passages between the poles of the rotor, so that the magnetic lines firstly go into the magnetic flux paths located between the permanent magnets and, along the rotation direction, behind the passage between the poles of the rotor; then the magnetic lines go into the passages between the poles of the rotor; and thus the total reluctance in the whole routes of the magnetic lines increases, and the variation of the reluctance caused by the variation of the relative position of the rotor with respect to the stator tooth slots takes less percentage in the total reluctance in the whole routes of the magnetic lines. Consequently, the fluctuation of the inductance decreases, and the reluctance torque ripple is reduced.

Figure 11:
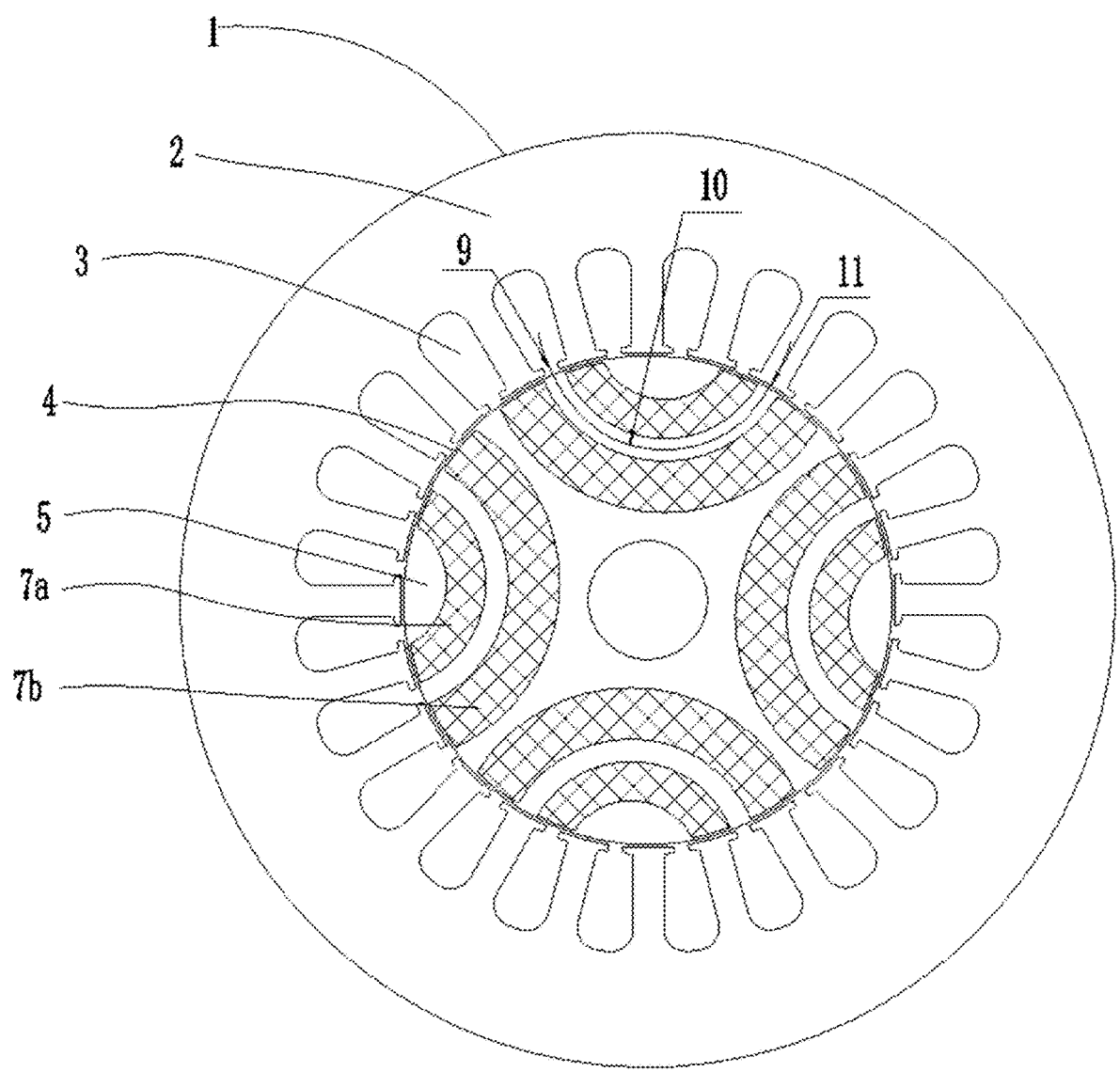
FIG. 11 is a schematic diagram illustrating the relative positions of the magnetic flux paths with respect to the stator tooth slots of the permanent magnet motor according to one embodiment of the present invention.

As one of the embodiments, as shown in FIG. 11, a magnetic flux path 10 is formed between the two neighbouring layers of permanent magnet grooves. One end of the magnetic flux path 10 directly faces the stator tooth 11, and the other end of the magnetic flux path 10 directly faces the stator slot 9. The arrangement, that one end of the magnetic flux path 10 between permanent magnets directly faces the stator tooth and the other end of the magnetic flux path 10 directly faces the stator slot, reduces the ripple of the quadrature-axis inductance of the motor when the relative position of the rotor with respect to the stator tooth slots changes, and makes the reluctance torque of the motor smoother.

Figure 10:
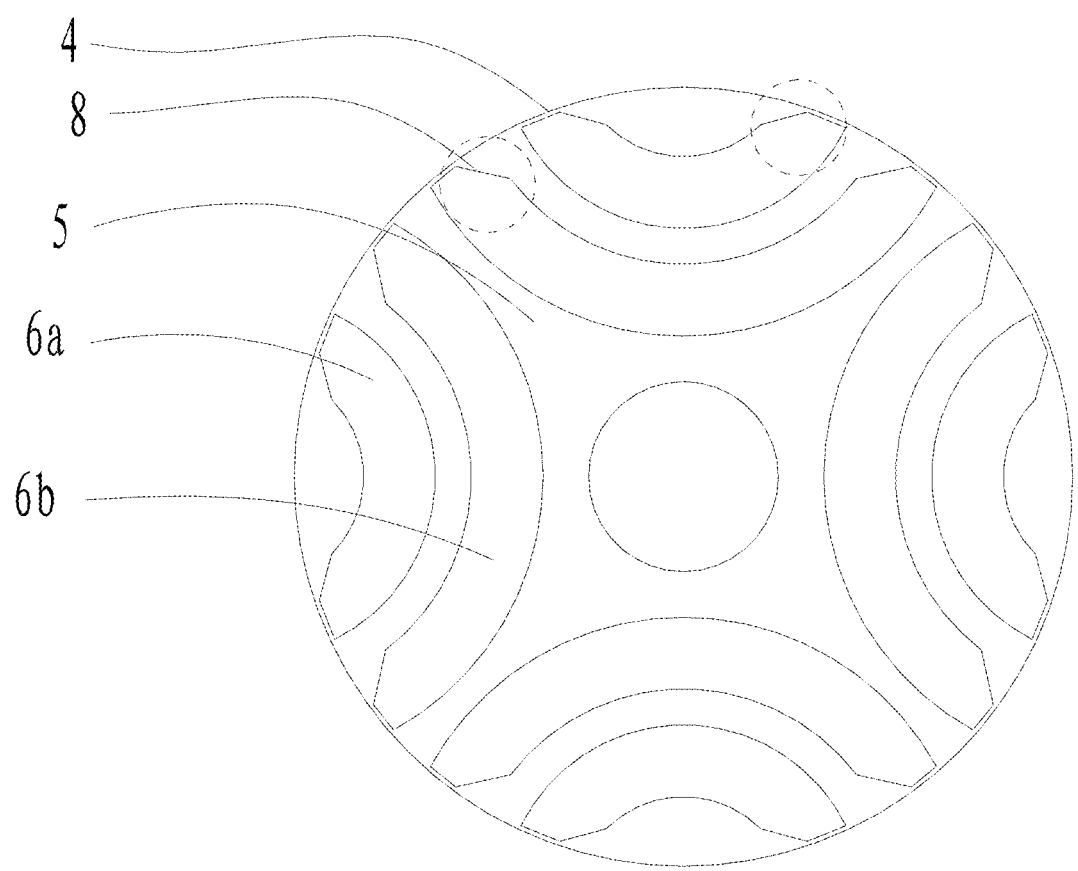
FIG. 10 is a schematic diagram illustrating the permanent magnet motor according to one embodiment of the present invention, wherein the permanent magnet grooves of the motor are chamfered on their outer faces.

In order to reduce the inner included angle A or B between the permanent magnet grooves of the rotor, the ends of the outer arcs of the permanent magnet grooves are cut. As shown in FIG. 10, the ends of the outer arcs of the permanent magnet grooves are cut into chamfers 8.

Figure 12:
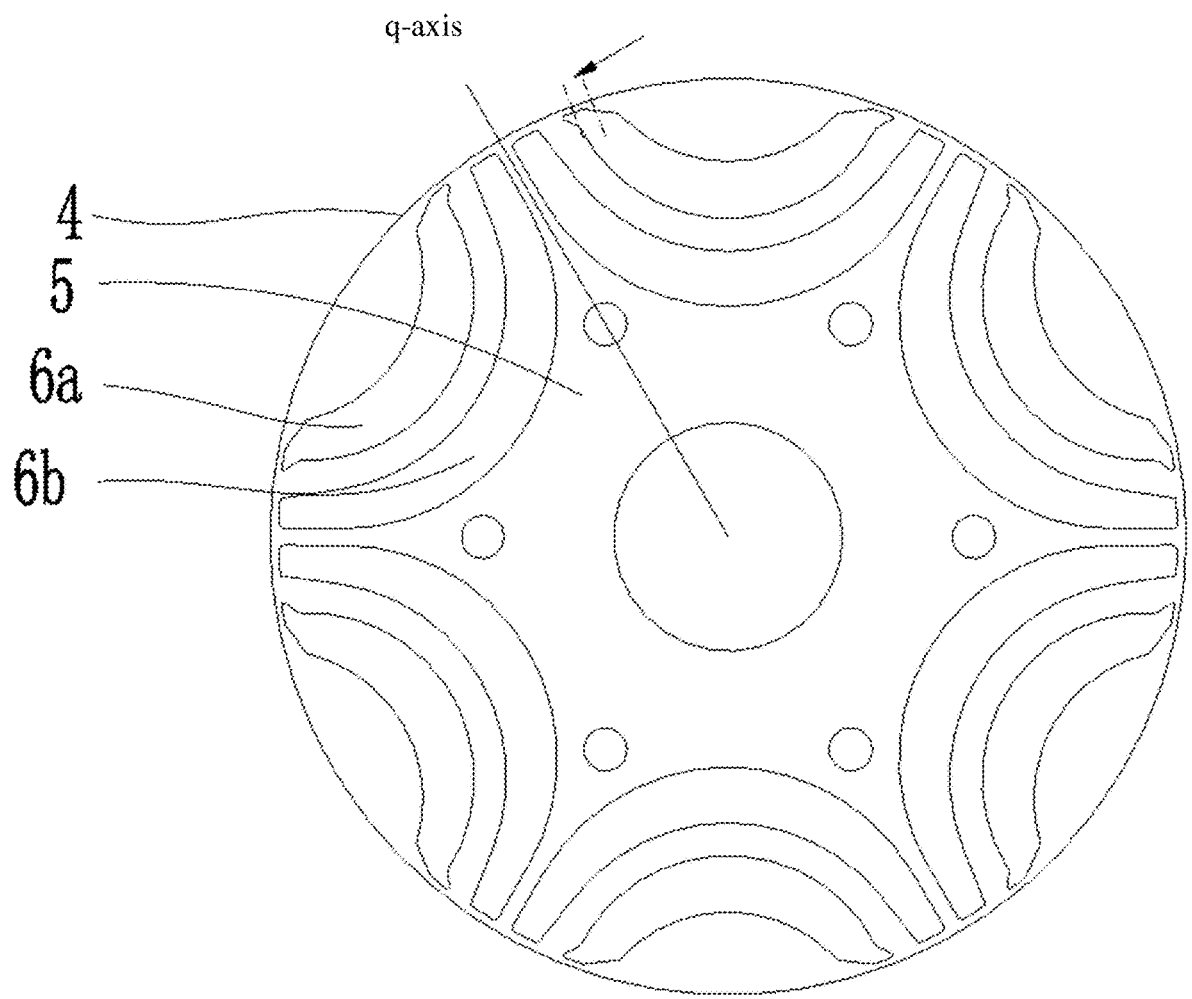
FIG. 12 is a schematic diagram illustrating the biased position of the endpoints of the permanent magnet grooves of the permanent magnet motor according to one embodiment of the present invention.

In order to reduce the inner included angle A or B between the permanent magnet grooves of the rotor, the endpoints of the permanent magnet grooves of the rotor are configured to be biased towards the boundary of the magnetic poles, i.e. the q-axis. As shown in FIG. 12, the endpoint of the permanent magnet groove is biased towards the q-axis, in the direction of the arrow shown in the figure.

Figure 13:
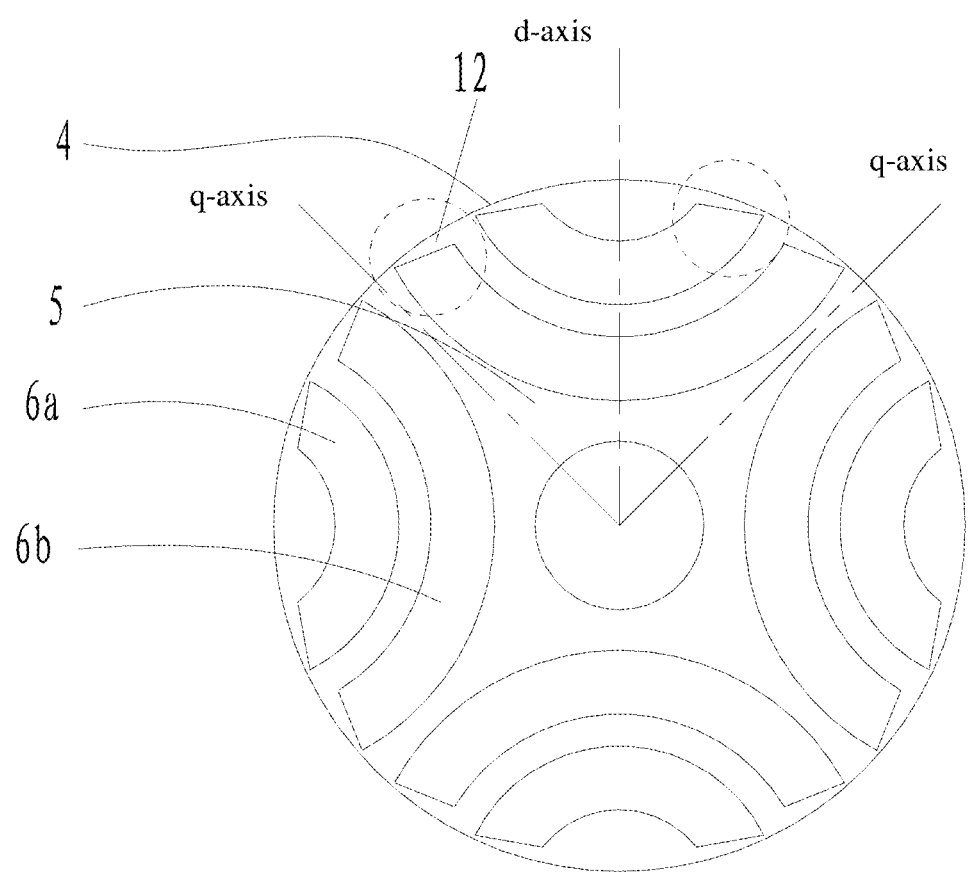
FIG. 13 is a schematic diagram illustrating the flux barrier of the permanent magnets of the permanent magnet motor according to one embodiment of the present invention, wherein the flux barrier has uneven thickness.

Similarly, the width of the flux barrier is configured to be uneven, decreasing gradually from the center line of the magnetic poles to the boundary of the magnetic poles, thereby realizing the effects of reducing the inner included angle A or B between the permanent magnet grooves of the rotor. As shown in FIG. 13, width of the flux barrier 12 of the rotor is uneven, decreasing gradually from the center line of the magnetic poles (the d-axis) to the q-axis.

The permanent magnet motors of the embodiments above can restrain the torque ripple of the permanent magnet assisted synchronous reluctance motor with multiple layers of permanent magnets arranged in the rotor, reduce the fluctuation of the difference between the direct-axis inductance and the quadrature-axis inductance along with the change of the relative position of the rotor with respect to the stator tooth slots, and can dramatically reduce the torque ripple thereof as compared with motors having existing structures.

What described above are several embodiments of the present invention, and they are specific and in details, but not intended to limit the scope of the present invention. It will be understood by those skilled in the art that various modifications and improvements can be made without departing from the conception of the present invention, and all these modifications and improvements are within the scope of the present invention. The scope of the present invention shall be subject to the claims attached.

What is claimed is:

1. A permanent magnet assisted synchronous reluctance motor for increasing minimum electromagnetic torque, comprising a stator and a rotor; said stator comprises a stator iron core and windings; wherein, the rotor comprises a rotor iron core and permanent magnets; in a radial direction of the rotor, each magnetic pole of the rotor iron core is provided with multiple layers of arc-shaped permanent magnet grooves; a q-axis magnetic flux path is formed between two neighboring magnetic poles or between each two neighboring inner and outer layers of adjacent permanent magnet grooves; the permanent magnets are disposed in the permanent magnet grooves;

two neighboring magnetic poles of the rotor are respectively a first magnetic pole and a second magnetic pole, the first and second magnetic poles have opposite polarities; an outer endpoint of a permanent magnet arranged in the first magnetic pole is a first outer endpoint, said first outer endpoint is farther from the q-axis; an outer endpoint of a permanent magnet arranged in the second magnetic pole is a second outer endpoint, said second outer endpoint is farther from the q-axis; an included angle A between the first outer endpoint and the second outer endpoint with respect to a center of the rotor is less than an electrical angle of 80 degrees; wherein number of stator slots is N; number of pairs of rotor poles is P; number of rotor poles is 2P, wherein 2P is 2 multiplied by P; number of phases of windings is m; and number of stator slots per pole per phase (N/2P/m) is an integer;

one endpoint of the q-axis magnetic flux path directly faces a center of a stator tooth, and another endpoint of the q-axis magnetic flux path directly faces a center of a slot opening of one of the stator slots, and the slot opening is provided in a radial direction of the stator slot.

2. The permanent magnet assisted synchronous reluctance motor according to claim 1, wherein the number of stator slots per pole per phase (N/2P/m) is two; and the included angle A is less than an outer included angle D between two stator tooth parts spaced by one stator tooth, with respect to the center of the rotor.

3. The permanent magnet assisted synchronous reluctance motor according to claim 1, wherein, a filling ratio of the permanent magnets in the permanent magnet grooves is configured to be greater than 85%.

4. The permanent magnet motor according to claim 1, wherein, a width of a flux barrier is configured to be uneven; and the width decreases gradually from a center line of the magnetic pole to the q-axis.

5. The permanent magnet motor according to claim 1, wherein, an endpoint of the permanent magnet groove is biased towards the q-axis.

6. The permanent magnet motor according to claim 1, wherein, endpoints of inner arcs of the permanent magnet grooves are cut into chamfers.

7. The permanent magnet motor according to claim 1, wherein, the number of phases of windings m is 6 windings between respective neighboring magnet grooves of the same magnetic pole.

8. The permanent magnet assisted synchronous reluctance motor according to claim 1, wherein, a width S between the magnetic poles of the rotor is less than a width G of the slot opening of the stator slot, wherein the slot opening communicates the stator slot with the rotor.

9. The permanent magnet motor according to claim 8, wherein, the number of phases of windings m is 6 windings between respective neighboring magnet grooves of the same magnetic pole.

10. The permanent magnet assisted synchronous reluctance motor according to claim 1, wherein, an outer endpoint of an inner layer of permanent magnet in the first magnetic pole is a third outer endpoint, said third outer endpoint is farther from the q-axis; an outer endpoint of an inner layer of permanent magnet in the second magnetic pole is a fourth outer endpoint, said fourth outer endpoint is farther from the q-axis; an included angle B between the third outer endpoint and the fourth outer endpoint with respect to the center of the rotor is configured to be less than an inner included angle C between two stator tooth parts spaced by one stator tooth, with respect to the center of the rotor.

11. The permanent magnet assisted synchronous reluctance motor according to claim 10, wherein, a filling ratio of the permanent magnets in the permanent magnet grooves is configured to be greater than 85%.

12. The permanent magnet assisted synchronous reluctance motor according to claim 10, wherein, a width S between the magnetic poles of the rotor is less than a width G of the slot opening of the stator slot, wherein the slot opening communicates the stator slot with the rotor.

13. The permanent magnet motor according to claim 10, wherein, an endpoint of the permanent magnet groove is biased towards the q-axis.

* * * * *